US006391621B1

(12) United States Patent
Naruse

(10) Patent No.: US 6,391,621 B1
(45) Date of Patent: May 21, 2002

(54) PROCESS FOR THE TREATMENT OF ORGANIC GAS COMPONENTS

(75) Inventor: Yasuhito Naruse, Shizuoka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/518,643

(22) Filed: Mar. 3, 2000

(30) Foreign Application Priority Data

Mar. 3, 1999 (JP) .............................. 11-054932
Mar. 15, 1999 (JP) .............................. 11-067889

(51) Int. Cl.[7] .............................. B01D 53/78; C12S 5/00
(52) U.S. Cl. ........................... 435/266; 422/4; 422/122; 210/150; 96/257; 96/263; 96/290; 96/296; 95/211; 95/213
(58) Field of Search .............................. 435/262, 262.5, 435/266; 422/4, 122; 261/96, 102, 108, 113; 210/150; 95/210, 211, 213; 96/263, 264, 257, 290, 296

(56) References Cited

U.S. PATENT DOCUMENTS 2,804,427 A * 8/1957 Suriano
4,609,386 A * 9/1986 Sibley et al.
5,011,675 A * 4/1991 Haure et al.

FOREIGN PATENT DOCUMENTS

| DE | 2718129 A | * 11/1978 | |
| GB | 1348863 A | * 3/1974 | |
| JP | 57-52066 | 11/1982 | ............. A61L/9/01 |
| JP | 58-186418 | 10/1983 | ........... B01D/53/34 |
| JP | 64-2569 | 1/1989 | ............. C12N/1/00 |
| JP | 5-123527 | 5/1993 | ........... B01D/53/34 |

OTHER PUBLICATIONS

Cheng et al. Derwent Abstract No. 1999–106704 of CN 1196275 Apr. 1997.*

* cited by examiner

Primary Examiner—William H. Beisner
(74) Attorney, Agent, or Firm—Sughrue Mion, PLLC

(57) ABSTRACT

To provide a process for treating gas for decomposing organic solvent and/or other organic gas contained in exhaust gas effectively and simply at low costs to remove the decomposition product of organic gas by applying other process. The gas can be treated very effectively by decomposing or removing a target gas component dissolved in liquid capable of treating the gas, preferably, by applying microbial treatment, after bringing the gas rising into contact with the liquid falling in a gas treatment tower wherein part of the gas (branched gas) is admixed with the liquid before feeding the liquid into the tower.

20 Claims, 3 Drawing Sheets

PROCESS FOR THE TREATMENT OF ORGANIC GAS COMPONENTS

FIELD OF THE INVENTION

The present invention relates to novel treatment of gas, more particularly, to a process for treating gas, e.g., exhaust gas containing organic gas such as an organic solvent and the like, preferably by bringing it into contact with liquid containing active sludge or the like under specified conditions to decompose it, or to remove it by other methods.

BACKGROUND OF THE INVENTION

There have been known various processes for destructive treatment of, e.g., exhaust gas containing an organic solvent such as a direct burning process, burning using media of a heat-accumulating type (heat-accumulating burning method) or an absorption method in which useful components are absorbed for recovery using activated carbon and the like as an absorbant.

Though not directed to the organic solvent, a microorganism-utilizing process is known for deodorizing sewage and the like. For example, JP-A-5-123527/1993 (the term "JP-A" as used herein means an unexamined "Japanese Patent Kokai Publication") discloses a process for deodorizing effectively odored exhaust gas by applying residual sludge (activated).

SUMMARY OF THE DISCLOSURE

However, in the course of the investigations toward the present invention the following problems have been encountered. Namely, among the aforementioned conventional processes, the direct burning process has such a drawback that it is expensive. The heat-accumulating burning method requires the addition of auxiliary fuel in case of applying this method under the condition of a high gas concentration to an extent of exceeding 500 ppm. Accordingly, its running cost is high. The method using the active sludge is applied now for deodorizing sewage and the like, however, its effectiveness is in question when applied for treating exhaust gas containing an organic gas such as vapor of an organic solvent such as methyl alcohol and ethyl alcohol. To this end, the treatment of exhaust gas using the active sludge is not generally put into practice.

Under such circumstances as mentioned above, the development of a novel practical process is required now which is excellent in treating effectively, simply and industrially the exhaust gas containing organic gas at low costs.

It is an object of the present invention to solve the above problems and provide an excellent treatment process of organic gas, especially, microbial treatment process of organic gas using active sludge and the like.

Further objects of the present invention will become apparent in the entire disclosure.

FIRST ASPECT

The present inventors studied assiduously to solve the above problems and attain the purpose of the present invention. As a result, it has been found that a target gas such as organic gas and the like can be treated very effectively by changing the flow rate ratio of the gas to the liquid with time in bringing a gas to be treated into contact with a liquid capable of treating the gas in a tower (or column) to decompose or remove the gas dissolved in the liquid. The present invention has been completed on the basis of the above findings.

In other words, according to a first aspect of the present invention, there is provided a process for treating a gas including the step of bringing a gas to be treated into contact with a liquid capable of treating the gas in a gas-treatment tower to decompose or remove the gas dissolved in the liquid while the flow rate ratio of the gas to the liquid is controlled so as to be appropriately changed versus time.

The tower may be a treatment tower, in which gas and liquid components are effectively brought into contact with each other to dissolve a target gas component into the liquid, i.e., which is capable of making gas-liquid contact effectively.

The first aspect of the invention includes the following embodiments:

1-1. the process in which the tower is a plate tower having, e.g., perforated plates etc. inside of the tower or a packed bed tower containing fillers in the tower;

1-2. the process in which the flow rate ratio is changed periodically to form a trigonometric function wave (e.g., sinusoidal, cosine, cosecant or cotangent function wave) or a composed wave of these waves; and 1-3. the process in which the liquid for treating the gas comprises a liquid containing active sludge or microorganisms capable of activating sludge.

The preferred embodiments of the present invention includes the following processes:

1a. A process for treating gas including the steps of using a gas-treatment tower such as a plate tower having, e.g., perforated plates disposed inside of the tower, packed bed tower containing fillers in the tower and the like, feeding a gas to be treated and a liquid capable of treating the gas into the tower to provide gas-liquid contact to decompose or remove a target gas while the flow rate ratio of the gas to the liquid is changed with time.

1b. in the process 1a, the flow rate ratio is changed periodically to form a trigonometric wave (or waves) or a composed wave thereof; and 1c. in the 1a process, the liquid comprises a liquid containing active sludge or microorganisms capable of living in the activating sludge liquid. Preferably, a liquid comprising microorganisms living in an activating sludge is used, said microorganisms being ones existing in a liquid for the active sludge-treatment.

SECOND ASPECT

The present inventors studied assiduously to solve the above problems and attain the purpose of the present invention. As a result, it has been found that a gas component contained in a treating liquid can be treated very effectively, e.g., decomposed, or the like, by applying microbial treatment or other treatment in the following way. Namely, one part of gas to be treated is rendered to flow up in a gas treatment tower. At the same time, the other part of the gas is branched and mixed with a liquid capable of treating the gas and allowed to flow down together with the liquid into the tower. Thus, both the parts of the gas are flown in opposing directions each other and brought into contact with the liquid in the tower. The present invention has been completed on the basis of the above findings.

In other words, according to the second aspect of the present invention there is provided a process for treating gas wherein a part of the gas to be treated is allowed to flow up in the gas treatment tower to perform gas/liquid contact, while the residual part of the gas is allowed to flow down in the tower together with a descending liquid to perform gas/liquid contact, thereby, bringing both the parts of the gas into contact with the liquid in the tower, to decompose or remove the target gas component contained in the liquid.

The tower may be a treatment tower, in which the gas and liquid components are effectively brought into contact with each other to dissolve the target gas component into the liquid, i.e., which is capable of performing gas-liquid contact effectively. Usually, the liquid is allowed to flow down. On the contrary, the gas is allowed to flow up from the bottom of the tower. Both of the liquid and the gas are brought into contact with each other to dissolve the target gas component of the gas into the liquid.

The second aspect of the invention includes the following embodiments.

2-1. The process in which the tower is a plate-stacked tower having perforated plates inside of the tower or a packed bed tower containing fillers in the tower. Preferably, feeding gas/liquid contact in the tower.

2-2. The process in which another part of the gas (branched gas) is fed in the midway of a pipe for feeding the liquid into the tower, e.g., the plate tower.

In this case, the mixing state of the liquid and the gas changes depending on kind and volume of the gas component(s), mixing process, time required for the mixture to travel from the mixing point to the top of the tower, temperatures of the liquid and the gas, etc. Usually, the fed gas (branched gas) is introduced into the tower while keeping such states that one part of the gas is homogeneously contained (dissolved) in the liquid and that the residual part of the gas is almost homogeneously mixed. This premixing is preferable, since it enables the liquid to perform preparatorily good contact with the gas. It is especially preferable that mixing is designed so as to dissolve most of the target gas component(s) to be treated into the liquid.

2-3. The process in which the gas dissolved in the liquid is decomposed and treated by a microbial treatment.

Various processes may be applied for decomposing or removing the target gas component irrespective of whether these processes are known or will be developed in the future. Among them, microbial treatment is preferable because it is applicable to the treatment of many kinds of gas components. Further, it can be done simply at low costs.

2-4. The process in which the liquid comprises a liquid for the active sludge treatment or a liquid containing microorganisms existing, or being capable of being used, in a liquid for activating sludge treatment.

The second aspect of the present invention includes the following preferred embodiments.

2a. A treatment for decomposing gas by feeding a gas to be treated and a liquid capable of treating the gas into a gas-treatment tower, which includes a plate tower having perforated plates stacked or laminated inside of the tower and packed bed tower containing fillers in the tower, to perform gas-liquid contact and decompose the gas on the condition that one part of the gas (branched gas) is fed into a path of a feed pipe of the liquid connected to the tower, preferably, to the plate tower.

2b. The process (2a) in which the liquid is a liquid for the active sludge treatment or a liquid containing microorganisms existing, or being capable of being used, in a liquid for activating sludge treatment.

BRIEF DESCRIPTION A OF DRAWINGS

PREFERRED EMBODIMENT (A) OF THE INVENTION

According to the present invention, there is provided a process for treating a gas component or gas components to be treated (target gas) (organic gas component(s)) contained in a gas-treatment liquid through characteristic contact of the target gas to be treated with the liquid, to decompose the target gas. Preferably, an active sludge process is applied for decomposing the target gas component(s) microbiologically by the function (active work) of microorganisms. An active sludge capable of decomposing an organic component by contact may be used. The active sludge includes any active sludge which is known and which will be developed in the future. Known active sludge processes can be applied. These processes are disclosed in, for example, JP-A-5-123527/1993, JP-A-58-186418/1983, JP-B-57-52066/1982 and JP-A-64-2569/1989 and the term "JP-B" means an examined "Japanese Patent Kokoku Publication") (The entire disclosures thereof being incorporated herein by reference thereto). In the present invention, the target gas may be treated by decomposing, separating or removing by using a chemical liquid and the like in place of applying the active sludge process.

In case of treating a gas by applying the active sludge processes, active sludge prepared by activating a plant effluent or general waste water with aerobic or anaerobic microorganisms can be used. Fixed or fixable microorganisms obtained from the residual sludge produced thereupon are also available.

Treatable gas component (i.e., gas to be treated) used in the present invention is not limited provided that it is an organic gas component. Especially in case of performing the microbial decomposition treatment based on the active sludge treatment and the like, any organic gas component capable of being decomposed can be used. Further, microorganisms capable of performing decomposition treatment in the active sludge can be selectively used depending on circumstances and conditions. Accordingly, many kinds of organic gases as can be treated. The number of the gas components is not limited to one. Namely, a gas mixture of plural components can be treated.

Figure 1:
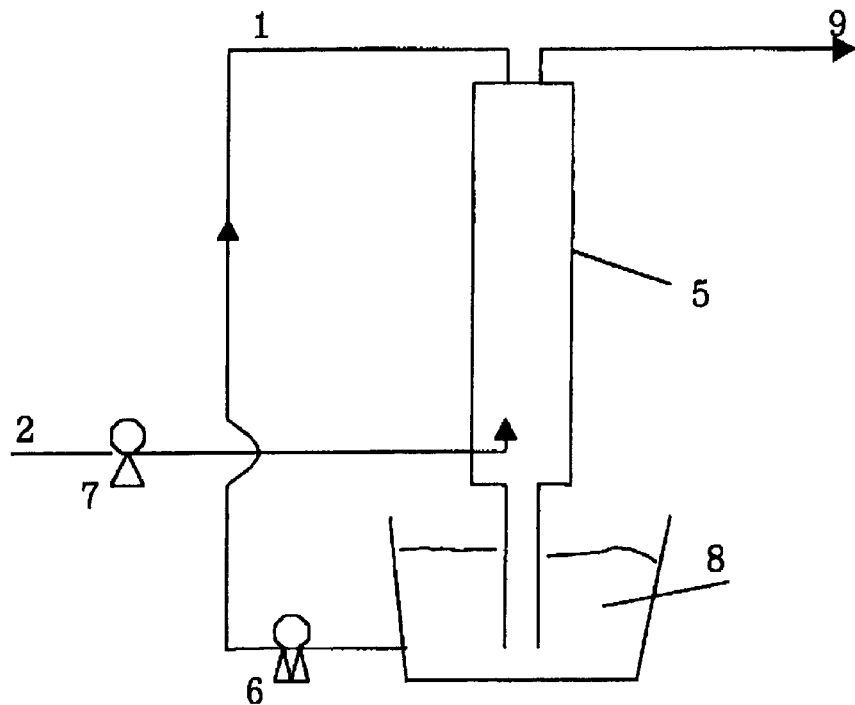
FIG. 1 is a schematic view showing a typical embodiment of an exhaust gas treatment apparatus used in a first aspect of the present invention.

A preferred embodiment of the first aspect of the present invention will be explained as follows in reference to FIG. 1. Of course, the present invention is not limited to the following embodiment. FIG. 1 is a schematic view showing a typical example of an exhaust gas-treating apparatus used in the present invention.

Figure 2:
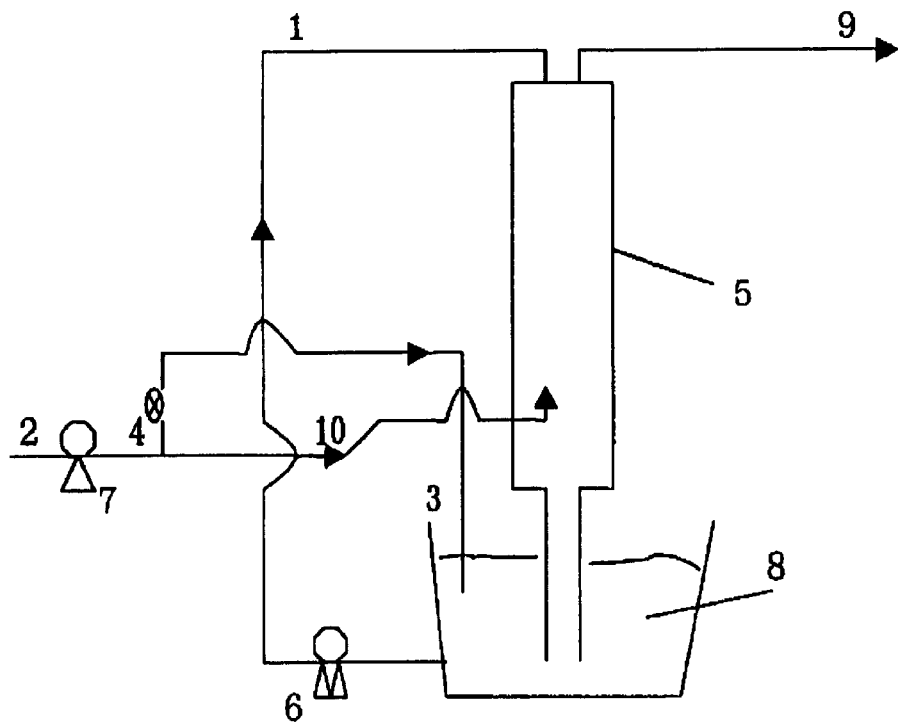
FIG. 2 is a schematic view showing another typical embodiment of an exhaust gas treatment apparatus used in a first aspect of the present invention.

Referring to FIG. 1, gas (gas to be treated 2) such as air and the like containing vapor of a solvent as an organic gas is blown into a plate-stacked or packed bed tower (gas-treatment tower 5) from the bottom of the tower for performing gas-liquid contact. Thus, the gas 2 is fed into the tower with its flow rate controlled so as to be changed with time by various methods. There are many processes for controlling the changing flow rate of the gas with time. Any of these processes can be selected. These processes include changing frequencies electrically of a motor installed in a blowing fan 7, changing the flow rate with time by controlling or actuating a mechanism of the motor, changing the flow rate with time by alternately opening and closing a branch (or bypass) pipe brunched from a feeding pipe as shown in FIG. 2, and the like.

Figure 3:
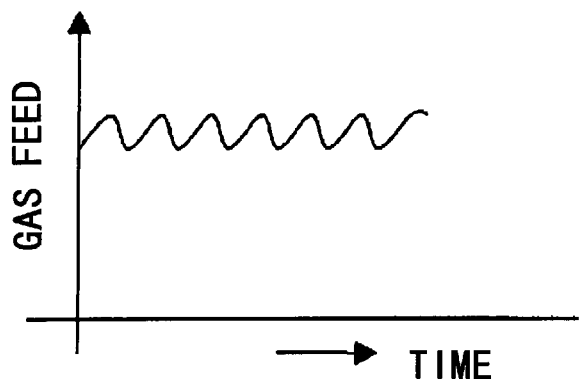
FIG. 3a shows an exemplary periodically changing flow rate pattern of a gas to be treated.
FIG. 3b shows another exemplary periodically changing flow rate pattern of a gas to be treated.
FIG. 3c shows a third exemplary periodically changing flow rate pattern of a gas to be treated.
Figure 3:
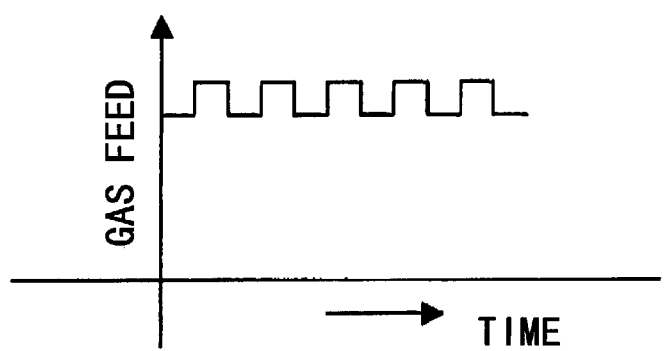
Figure 3:
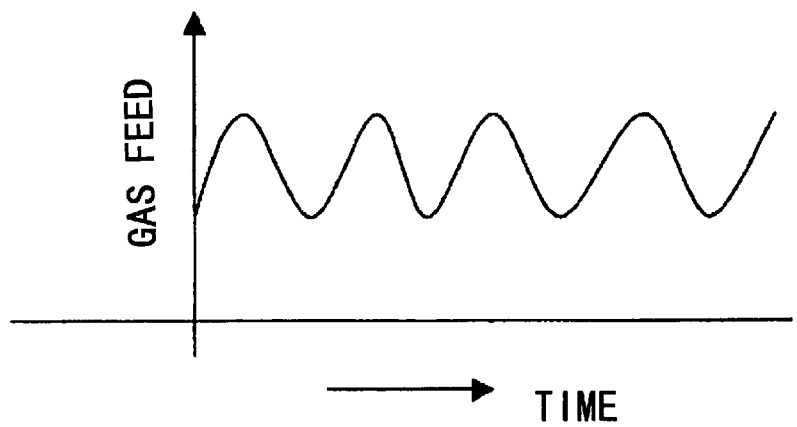

Periodic changing pattern (form) of the flow rate includes trigonometric function wave (e.g., sinusoidal) forms, composite from of these forms such as rectangular (or pulse) wave form, or a composed wave form thereof and the like, or bottom-raised (off-set) forms of these changing waves, and the like. Typical types of the changing pattern are shown in FIGS. 3 (A) to (C).

Effective frequencies of the periodic changing flow rate range from 0.1 Hz to several tens of kHz (e.g., up to about 30 kHz), preferably, from 1 to 1,000 Hz in order to obtain a particularly great effect, and more preferably from 5 to 600 Hz. The number of the frequency component is not limited to one. The amplitude ratio (range) of the changing flow rate is 1 to 100% to the maximum amplitude of the changing flow rate (The maximum value of the changing flow rate corresponds to ($a_0$) illustrated in FIG. 4 in which the changing range is marked $a$.). The ratio of the changing flow rate in amplitude is preferably, about 10 to about 50% in order to obtain a great effect especially, more preferably, about 15 to about 40%.

When the volume of the gas to be treated is regulated so as to be changed with time, in case of using, for example, the plate tower, the gas and the liquid are fluidized on the plate of the plate tower to change the mixture of these materials into a microscopically unstable or unsteady turbulent state. This accompanies an increase of the interfacial refreshing speed of gas and liquid, i.e., the gas and the liquid which contains active sludge and the like. Thereby, the absorbing speed of the gas to be treated into the liquid and the reaction speed of the gas with the liquid can be increased. Consequently, the decomposition of the gas can be increased. The frequencies effective for these purposes mainly range from about 0.1 Hz to several tens of kHz, preferably, from about 1 to about 1,000 Hz.

Further, macroscopically, there is also such an effect that the fluidizing width of the gas and the liquid on a plate stage can be changed with time. This change is effective to prevent wave residence (stall of the flow), flowing through short path and also the occurrence of other problems including the adhesion of solid substances to the wall of the tower. The frequencies effective for these purposes prevailingly range from about 0.1 Hz to several tens of kHz.

The gas-treatment tower may be approximately of 8 to 300 cm in diameter with a height of 50 to 500 cm, approximately. In case of the plate power, the plates may approximately amount to 3–6 plates (stages), with no limitation thereto with an interval of 10 to 60 cm, approximately. The plate is usually perforated with bores having a diameter of 0.6 to 1.5 cm, approximately at a pitch of 0.8 to 3.0 cm, approximately.

As mentioned above, any organic gas can be treated in the present invention. Exemplary organic gas to be treated includes methyl ethyl ketone, acetone, methyl isobutyl ketone, methanol, ethanol, propyl alcohol, isopropyl alcohol, butanol, ethyl acetate, toluene, xylene, methylene glycol, methylene glycol monomethyl acetate, methylene glycol monoethyl acetate, methylene glycol monomethyl ether, propylene glycol monomethyl ether, methylene glycol monoethyl ether, ethylene glycol monomethyl ether, ethylene glycol monoethyl ether, and the like. Not only single kind of the gas but also a gas mixture of plural kinds can be treated according to the present invention.

The maximum concentration of the gas to be treated may be different depending on the kind of the gas, but generally, up to about 20,000 ppm, in general.

PREFERRED EMBODIMENT (B) OF THE INVENTION

A second aspect of the present invention resides in a process for (subsequently) treating a gas component to be treated contained in a liquid capable of treating the gas component after the characteristic gas-liquid contact of gas to be treated with the liquid. In the subsequent treatment, it is preferred that an active sludge process is applied for microbiologically decomposing (or further or otherwise removing) an organic gas component by the function of microorganisms. Other processes may be applied for removing the organic component. In applying the active sludge process, active sludge capable of decomposing (or further removing) an organic component by contact may be used. Known active sludge processes can be applied. These processes are disclosed in, for example, JP-A-5-123527/1993, JP-A-58-186418/1983, JP-B-57-52066/1982 and JP-A-64-2569/1989 (The entire disclosures thereof being incorporated herein by reference thereto).

Available processes in the present invention other than the active sludge process include a process for decomposing, separating or otherwise removing target gas by using a chemical liquid or else. Decomposing processes and other processes which will be developed in the future are also available.

In case of treating a gas by applying the active sludge processes, active sludge prepared by activating a plant effluent or general waste water with aerobic or anaerobic microorganisms can be used. Fixed microorganisms obtained from residual sludge produced thereupon can also be used.

According to the present invention, treatable gas component contained in gas to be treated is not limited except that it belongs to organic gas components. In case of making microbial decomposition treatment by active sludge and the like, microorganisms capable of performing the decomposition treatment can be selectively used depending on circumstances and conditions. Thereby, general kinds of organic gas can be treated.

The number of the gas component is not limited to one. Namely, a gas mixture of plural components can be treated in the present invention.

A preferred embodiment of the second aspect of the present invention will be explained as follows in reference to FIG. 5. Of course, the present invention is not limited to the following embodiment.

Figure 5:
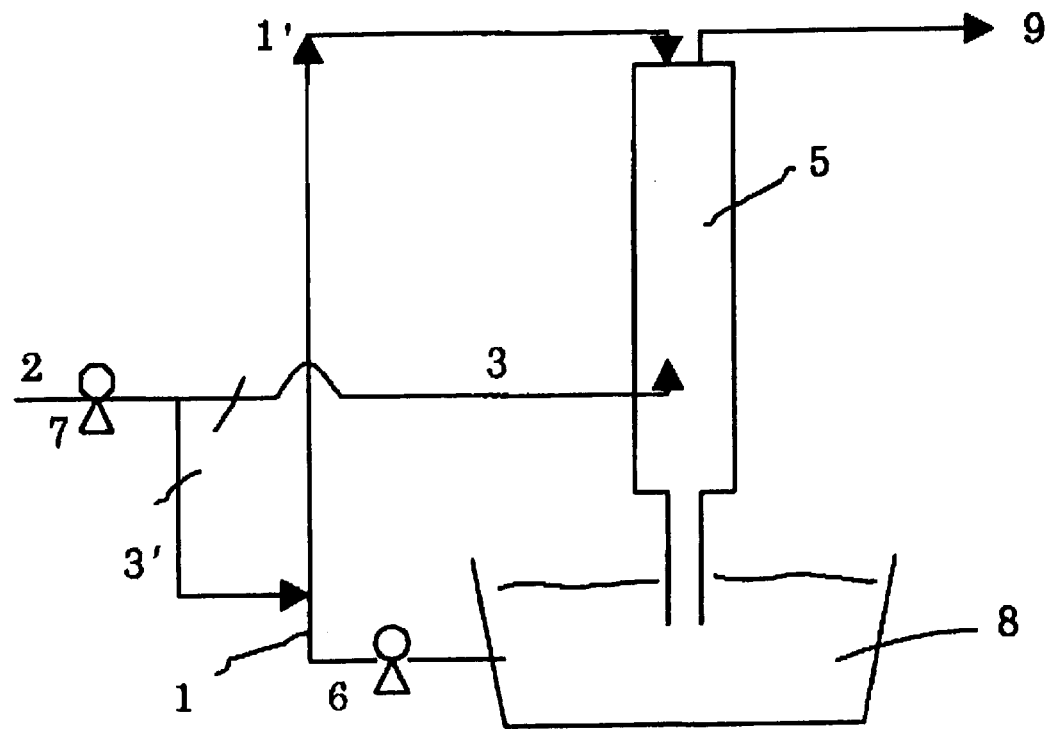
FIG. 5 is a schematic view showing a typical embodiment of an exhaust gas treatment apparatus used in a second aspect of the present invention.

FIG. 5 is a schematic view showing a typical example of an exhaust gas treater used in the present invention.

Referring to FIG. 5, gas (gas to be treated 3) such as air and the like, which is one part of the gas to be treated 2 and contains an organic gas, vapor of a solvent is blown into a plate or packed bed tower (gas-treatment tower 5) from the bottom of the tower for performing gas-liquid contact. The other part of the gas (branched gas 3'), which has the same components as the above part of the gas and contains the vapor of the same solvent, is mixed by a pump 6 with liquid 1 capable of treating the gas in the midway of a path flowing the liquid 1 into the tower 5. Thus, one part of the gas 2 in the state of the branched gas 3' is preliminarily admixed with the liquid followed by introducing into the tower.

Here, the parting ratio of the gas 2 is arbitrary. The parting ratio should be changed appropriately depending on a variety of conditions such as kind of gas component(s) contained in the gas to be treated, concentration of the gas component(s) to be treated, solubility of the gas component(s) in a liquid capable of treating the gas component, flow rate ratio of the gas relative to that of the liquid, structure of a tower for treating gas. Especially, it is important to set or control the flow rate ratio of the branched gas 3', which is preparatorily admixed with the liquid 1, to the liquid 1 into an optimum condition.

The ratio of the branched gas 3' to the total of the gas to be treated 2 is adjusted generally to range from about 5 to about 70%, preferably, from about 20 to about 40%. In case that this ratio is less than 5%, preparatorily admixing effect is lowered. In case that the ratio exceeds 70%, preparatorily admixing effect is also lowered, or, the mixing state in the tower, for example, on the plate stage of a plate tower becomes deteriorated against expectation. Accordingly, both of the above cases are not preferable.

By feeding the gas to be treated (branched gas 3') into the liquid 1 in the midway of the aforementioned liquid flow path, the reaction of the gas with the liquid is accelerated during performing contact of the gas and the liquid into contact with each other in the tower, especially, in case of using a liquid containing active sludge as the liquid 1 in order to improve the decompositional treatment of the gas.

It is especially preferred that the gas to be treated can be mixed homogeneously in the above midway. In this case, good efficiency can be obtained as compared with the case of only feeding the gas into the tower 5 from the bottom and making gas-liquid contact only inside the tower. It is one of the features of the present invention to feed a part of the gas to be treated (branched gas 3') in the above midway. Then, it is permissible to bring part or whole of the gas to be treated into contact with whole or part of the liquid, if necessary, in different places from the inside of the tower in addition to performing the fundamental gas-liquid contact in the inside of the tower.

According to the present invention, the feed rate ratio of the gas to be treated (branched gas 3' containing about 5 to about 100%, preferably, 10 to 50% of gas component to be treated) is usually about 15 to about 50%, preferably, about 20 to about 45% by volume to the flow rate of the liquid capable of treating the gas in order to enhance treating efficiency. In case that the feed rate ratio of the gas is less than 15%, treating effect is lowered. In case that the feed rate ratio of the gas exceeds 50%, the space of the gas occupied in the tower becomes enlarged as compared with that of the liquid as if the liquid was dispersed in the gas. Consequently, expected effects are decreased against expectation. As is evident from the above, both of the above cases are not preferred.

As mentioned above, any organic gas can be treated in the present invention. Exemplary organic gas to be treated includes methyl ethyl ketone, acetone, methyl isobutyl ketone, methanol, ethanol, n-propyl alcohol, isopropyl alcohol, butanols, ethyl acetate, toluene, xylene, ether, methylene glycol, methylene glycol monomethyl acetate, methylene glycol monoethyl acetate, methylene glycol monomethyl ether, methylene glycol monoethyl ether, methylene glycol monoethyl ether, ethylene glycol monomethyl ether, ethylene glycol monoethyl ether, propylene glycol monomethyl ether, and the like. As mentioned above, not only single kind of the gas but also a gas mixture of plural kinds can be treated according to the present invention.

The maximum treatable concentration of the total gas (gas to be treated 2) is different depending on the kind of the gas, but amounts to generally, up to about 5,000 ppm, preferably, up to about 3,000 ppm, more preferably, up to about 2,000 ppm.

The mean cross-sectional speed of the gas to be treated in the tower for treating gas ranges approximately from 0.01 to 10 m/sec.

There are many methods of mixing effectively the above branched gas 3' with the liquid 1. These methods can be selected from conventional methods of mixing gas with liquid, preferably, from these of mixing homogeneously. For example, the method of using various static mixers, the method of feeding fine gas bubbles generated through pores disposed on a pipe or the like can be employed.

EXAMPLE A

The first aspect of the present invention will be explained more in detail by the following examples and comparative examples.

Example A1

In a gas treater as schematically illustrated in FIG. 1, a gas containing vapor of methanol (organic gas) was treated by using a liquid containing active sludge for treating the gas.

Referring to FIG. 1, gas 2 of air containing the vapor of methanol in an amount of 1,200 ppm is fed into a treatment tower 5. By changing the revolution of a blowing fan 7 electrically with time, the flow rate of the gas is changed periodically. The time-dependently changing component of the flow rate is in the form of a trigonometric function wave (triangular wave shape) of 200 Hz. The width (a) of the changing (varying) component is 15% relative to the width ($a_0$) of a fixed component (off-set maximum value of the flow rate) (cf. FIG. 4).

$a/a_0=0.15$

The treatment tower had a diameter of 30–60 cm and a height of 100–200 cm and 3 plates therein with bores of 1.5 cm in diameter at a pitch of 2 cm. The plates were disposed at a vertical interval of about 30 cm between the plates.

While the flow rate of the gas or air is changed, the (fixed) flow rate of the air in the tower was controlled at 0.7 m/sec, and the mean cross-sectional flow rate of the liquid 1 (liquid containing active sludge) in the tower was regulated at 0.2 m/sec. The active sludge was sampled from sewage water treatment station at our company (factory) having a concentration of 0.1 to 1% by weight (or 0.1 to 1 mg/litter in terms of MLSS=Mixed Liquid Suspended Solid) and an SVI (active sludge index) of 50 to 100. Air was blown using a turbofan "Three Ace SRP30" manufactured by Ebara Seisaku-sho K.K., rotated at a rated revolution per minute of 3000 rpm and modulated between 2000 rpm and 4000 rpm.

The resultant gas (vapor) concentration of methanol exhausted from the tower 5 was 15 ppm.

Comparative Example A1

The same procedure of Example A1 was repeated except that the blowing fan 7 was rotated at a fixed velocity, i.e., without superposing the electric changing component to the revolutional speed of the fan 7 with time. The resultant vapor concentration of methanol exhausted from the tower 5 was 40 ppm.

Example A2

In a gas-treating apparatus as schematically illustrated in FIG. 2, a gas containing vapor of methyl ethyl ketone (organic gas) was treated using a liquid containing active sludge for treating the gas.

Referring to FIG. 2, gas 2 of air containing the vapor of methyl ethyl ketone in an amount of 800 ppm was fed into a tower 5 for treating. By alternately opening and shutting a valve 4 at time intervals of 35 Hz, the flow rate of the air 10 containing the vapor of the solvent for feeding into the tower 5 was changed periodically into the form of a pulse. The amplitude of the changing feed rate on the gas component flowing into the tower 5 was 18% relative to that of the fixed flow rate. In the course of changing the flow rate of the gas or air, the (fixed) flow rate of the air in the tower was controlled at 1.1 m/sec at the time of shutting the valve, and the mean cross-sectional flow rate of the liquid 1 (liquid containing active sludge) in the tower was regulated at 0.3 m/sec.

Figure 4:
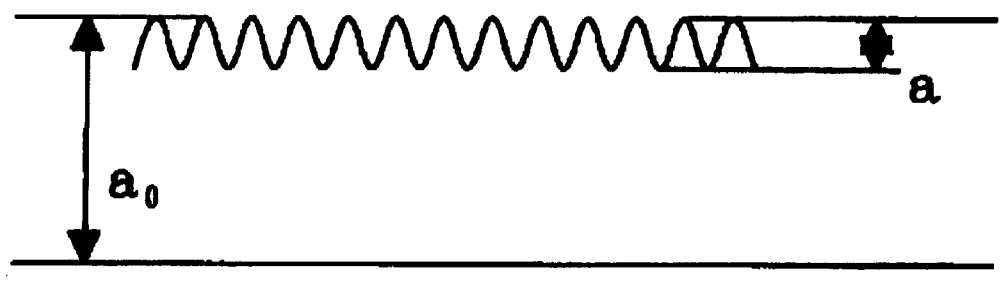
FIG. 4 shows the ratio of changing amplitude (a) to a non-variant (maximum) amplitude ($a_0$) in a periodically changing flow rate pattern of gas to be treated.

$a/a_0 = 0.18$ (cf. FIG. 4).

The resultant vapor concentration of methanol exhausted from the tower 5 was 39 ppm.

Comparative Example A2

The same procedure of Example A2 was repeated except that the valve 7 was always shut and the gas to be treated was fed into the tower 5 at a constant air flow. Namely, the air flow of the gas is equivalent to the air flow at the time of shutting the valve 4 in Example A2. The resultant vapor concentration of methyl ethyl ketone exhausted from the tower 5 was 90 ppm.

It will be understood from the above results that the decomposition of target gas can be increased by changing time-dependently the feed rate of gas to be treated feeding into liquid capable of treating the gas.

EXAMPLE B

Next, the second aspect of the present invention will be explained more in detail by the following examples and comparative examples.

Example B1

In a gas treating apparatus as schematically illustrated in FIG. 5, gas containing the vapor of methanol was treated by using liquid containing active sludge for treating the gas.

Referring to FIG. 5 which illustrates a flow chart of treating performed in a gas treater, air (gas to be treated 2) containing vapor of methanol in an amount of 1,500 ppm was fed into a gas-treatment tower 5 in the following way. One part of the gas (partial gas to be treated 3) was directly fed into the tower from the bottom of the tower for bringing it into contact with liquid for treating according to the conventional method. On the other hand, the residual part of the gas (branched gas 3') was fed into and mixed with the liquid 1 in the midway of the liquid's flow path. The ratio of the branched gas 3' to the gas 2 was adjusted to 30%.

In the above process, the flow rate of the air in the tower was controlled at 0.6 m/sec, and the mean cross-sectional flow rate of the liquid (liquid containing active sludge) in the tower was regulated at 0.2 m/sec. The resultant vapor concentration of methanol exhausted from the tower 5 was 45 ppm.

Comparative Example B1

The same procedure of Example B1 was repeated except that the ratio of the branched gas 3' to the total gas 2 was 0%, i.e., premixing of the partial gas with the liquid 1 was not carried out. The resultant vapor concentration of methanol exhausted from the tower 5 was 160 ppm.

As is evident from the above results, treating efficiency of the target gas (gas to be treated) can be increased prominently by feeding part of the gas to be treated into the liquid capable of treating the gas and mixing the part of the gas with the liquid in the midway of the liquid-feeding path, especially, in case of using liquid containing active sludge in a gas-treatment tower by contacting the gas with the liquid.

The meritorious effects of the present invention are summarized as follows.

According to the first aspect of the present invention, a target gas (gas to be treated) can be effectively treated by changing the flow rate ratio of gas to liquid with time in bringing a gas to be treated into contact with a liquid capable of treating the gas in a gas-treatment tower to decompose and/or remove the gas dissolved in the liquid.

According to the second aspect of the present invention, a target gas (gas to be treated) can be very effectively treated by bringing the gas to be treated, e. g., gas containing vapor of an organic solvent or the like, into contact with a liquid capable of treating the gas provided that part of the gas to be treated (branched gas) is fed into the tower after admixing with the liquid, and decomposing and/or removing a target gas component dissolved in the liquid after the gas-liquid contact, especially, by microbial treatment.

THIRD ASPECT

It is self-explanatory that a combined process may be realized by combining the processes of the first and second aspects. The combination of the embodiments and conditions according to the first and second aspects can be likewise achieved by the present invention.

The combination may be done by sequentially or even simultaneously, or both.

A plurality of possible combined modes are conceived within the scope of the present invention based on the concrete embodiments of the first and second aspects.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed is:

1. A process for treating gas comprising:
   bringing a gas to be treated into contact with a liquid capable of treating said gas in a gas-treatment tower to decompose or remove the gas dissolved in said liquid, wherein said tower is a plate tower having perforated plates inside thereof or a packed bed tower containing fillers therein and has at least a piping for feeding said gas and said liquid into said tower,
   wherein one part of said gas is allowed to flow up and the other part of said gas is allowed to flow down in a state of gas-liquid contact in said tower, to bring both the parts of said gas into contact with said liquid, and wherein said the other part of said gas is fed into midway of a pipe for feeding said liquid into said tower.

2. The process as defined in claim 1, wherein said gas is decomposed or removed by microbial treatment.

3. The process as defined in claim 1, wherein said liquid comprises a liquid for active sludge treatment or a liquid containing microorganisms capable of being used for activating sludge treatment.

4. The process as defined in claim 1, wherein the other part of the gas is allowed to flow in a volumetric ratio of 15 to 50% relative to a flow rate of said liquid.

5. The process as defined in claim 1, wherein said the other part of the gas is allowed to flow in a volumetric ratio of 20 to 45% relative to a flow rate of said liquid.

6. The process as defined in claim 1, wherein said gas to be treated contains a gas component to be treated approximately of 5 to 100% by volume.

7. The process as defined in claim 1, wherein said gas to be treated contains a gas component to be treated approximately of 10 to 50% by volume.

8. The process as defined in claim 1, wherein said gas to be treated comprises at least one organic gas.

9. A process for treating a gas comprising;
bringing a gas to be treated into contact with a liquid capable of treating said gas in a gas-treatment tower, wherein said tower is a plate tower having perforated plates inside thereof or a packed bed tower containing fillers therein and has at least a piping for feeding said gas and said liquid into said tower and
changing a flow rate ratio of said gas to said liquid with time during said contact to decompose or remove the gas dissolved in said liquid,
wherein one part of said gas is allowed to flow up and the other part of said gas is allowed to flow down in a state of gas-liquid contact in said tower, to bring both the parts of said gas into contact with said liquid, and wherein the other part of said gas is fed into midway of a pipe for feeding said liquid into said tower.

10. The process as defined in claim 9, wherein said flow rate ratio is changed by a frequency cycle approximately ranging from 1 Hz to 1000 Hz.

11. The process as defined in claim 9, wherein said flow rate ratio is changed by a frequency cycle approximately ranging from 5 Hz to 600 Hz.

12. The process as defined in claim 9, wherein said flow rate ratio is changed by a frequency cycle approximately ranging from 35 Hz to 200 Hz.

13. The process as defined in claim 9, wherein said flow rate ratio is changed in amplitude by a changing ratio of approximately ranging from 10 to 50% of amplitude.

14. The process as defined in claim 9, wherein said flow rate ratio is changed in amplitude by a changing ratio of approximately ranging from 15 to 40% amplitude.

15. The process as defined in claim 9, wherein said flow rate ratio is changed in amplitude by a changing ratio of approximately ranging from 15 to 18% of amplitude.

16. The process as defined in claim 9, wherein said flow rate ratio is changed periodically in a wave form of a trigonometric function or a wave composed thereof.

17. The process as defined in claim 9, wherein said flow rate ratio is changed periodically by a frequency cycle ranging from 0.1 Hz to 30 kHz, and/or changed in amplitude by a changing ratio of 1 to 100% of amplitude.

18. The process as defined in claim 9, wherein said liquid comprises a liquid for active sludge treatment or a liquid containing microorganisms capable of being used for activating sludge treatment.

19. The process as defined in claim 9, wherein said gas is decomposed or removed by microbial treatment.

20. The process as defined in claim 9, wherein said gas to be treated comprises at least one organic gas.

* * * * *